March 31, 1931. A. B. TUCKER 1,798,508
INTERNAL COMBUSTION ENGINE
Filed Sept. 4, 1928
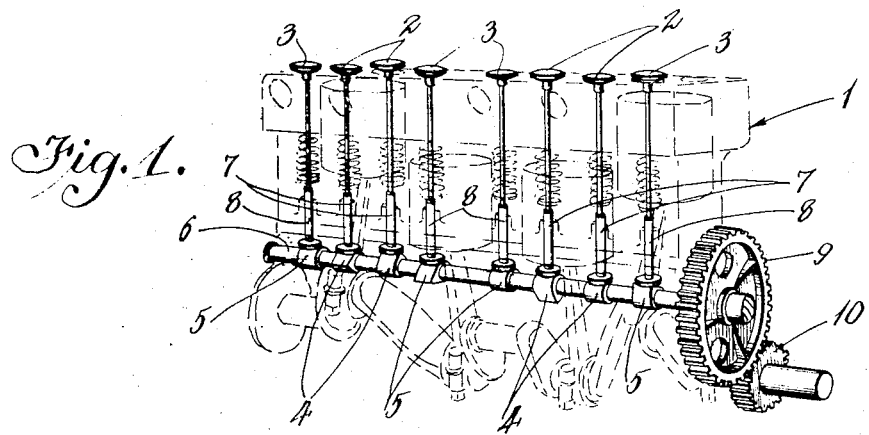
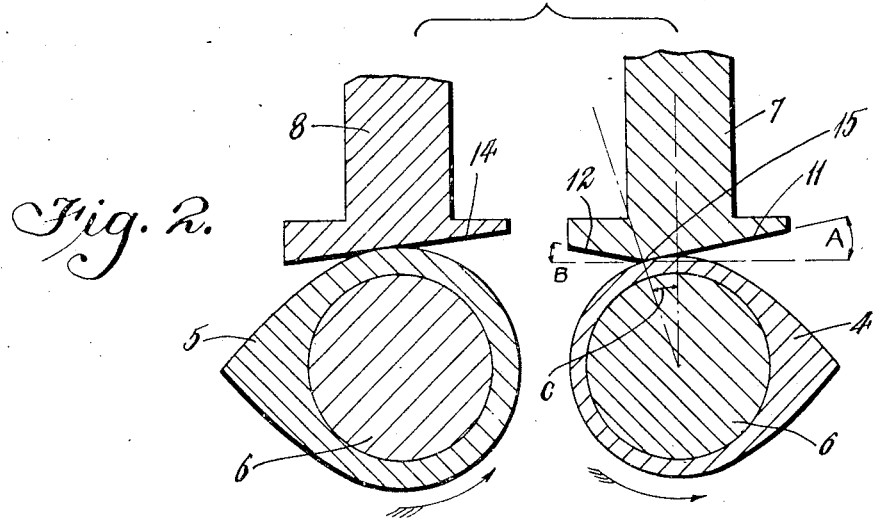
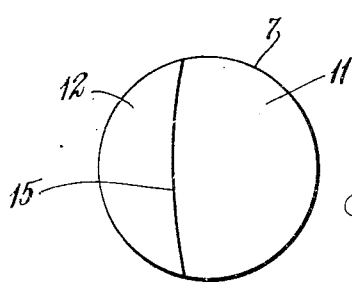
Inventor
Alfred B. Tucker
By Lyon & Lyon
Attorneys Patented Mar. 31, 1931

1,798,508

UNITED STATES PATENT OFFICE

ALFRED B. TUCKER, OF LOS ANGELES, CALIFORNIA

INTERNAL-COMBUSTION ENGINE

Application filed September 4, 1928. Serial No. 303,775.

This invention relates to internal combustion engines, and is more particularly related to a method and means for controlling the admission of fuel to the firing chambers of such an engine, and for discharging the burnt fuel or exhaust from the firing chamber by controlling the action of the intake and exhaust valves thereof.

In an internal combustion engine, including a vertically reciprocated piston, it is obvious that the piston travels in a manner so that its lineal velocity as compared with the intervals of time is a sine curved action, the piston starting from zero velocity when beginning its stroke, and gradually picking up speed until its maximum speed is reached, when the crank shaft is rotated at 90 degrees. The rate of speed of the piston then gradually decelerates during the next 90 degrees of rotation of the crank shaft.

In order to maintain a uniform flow of fuel into the firing chamber controlled by a piston traveling in this manner, it is required that the intake valve permitting the fuel to flow into such a fuel chamber be opened so as to maintain a uniform draw, or suction, through the valve during the time when the speed travel of the piston is accelerating and decelerating, and the maintenance of this uniform draw or suction pressure through the intake valve opening has been found to be essential to admit into the firing chamber the largest charge of fuel. I have found that by regulating or controlling the opening of the intake valve so that the same opens to maintain a uniform proportion or relation between the suction or vacuum created by the traveling of the piston during the stroke of the piston, that a maximum quantity of fuel will be drawn into the firing chamber.

In order to maintain a uniform proportion between the intake valve opening and the suction created by the piston traveling at a variable speed, I have provided a combination cam and cam follower acting to open the intake valve designed to give a variable opening of such valve in timed relation with the reciprocation of the piston in the firing chamber.

It is, therefore, an object of my invention to provide a method of admitting fuel to the firing chamber of an internal combustion engine to permit the admission into such firing chamber of a maximum quantity of fuel by maintaining a uniform draw or suction of the fuel through the valve opening from the carburetor or fuel mixing device.

Another object of this invention is to provide an improved form of cam and cam-follower operatively connected with the intake valve of an internal combustion motor to cause the intake valve to open variably in definite relation to the speed of travel of the piston in the firing chamber of the internal combustion engine.

Another object of this invention is to provide an improved form of exhaust valve cam acting mechanism which will operate to control the speed of opening and closing of the exhaust valve of an internal combustion motor to open the exhaust valves wide and maintain the exhaust valves wide open for a longer period of time and close the exhaust valves at a lower speed of travel, giving the burnt fuel, or gases, more freedom for escape, thereby eliminating the possibility of burning the valves of the internal combustion motor and aiding in the maintenance of the motor cool.

Other objects and advantages of this invention it is believed will be apparent from the following detailed description of a preferred embodiment thereof as illustrated in the accompanying drawings:

In the drawings:

Figure 1 is a perspective view of an internal combustion engine, illustrating the same with the head and pan removed, and illustrating the adaptation of my invention.

Figure 2 is an enlarged sectional view of the cam and cam-followers embodying my invention.

Figure 3 is a plan view of one of the intake cam-followers embodying my invention.

In the preferred embodiment of my invention illustrated in the accompanying drawings, 1 indicates a motor which may be of any suitable form, and which includes a plurality of firing chambers, the intake and exhaust form of which are controlled by intake valves 2 and exhaust valves 3. As is common in such construction, the intake valves 2 and exhaust valves 3 are opened and closed by means of cams 4 and 5 respectively, secured to a cam shaft 6. The cams 4 and 5 are engaged by cam-followers 7 and 8. The opening of the valves 2 and 3, and the closing thereof is controlled by the action of the cams 4 and 5 acting in conjunction with the cam-followers 7 and 8, and this timed action is adjusted by means of the timing gears 9 and 10. The timing gear 10 is customarily secured to the crank shaft from the motor and meshes with the timing gear 9, which is secured to the cam shaft 6.

In accordance with my invention, the cam-followers 7 and 8 are formed in a manner to control the opening of the intake and exhaust valves 2 and 3. The cam-follower 7 is formed on its engaging face to two different angles A and B, the particular angle of the faces 11 and 12 of the cam-follower 7 being such as will maintain a definite ratio between the opening of the intake valve 2 and the suction created throughout the stroke of the piston of the engine 1 in the firing chamber. In order to obtain this ratio of valve opening to suction, the cam-follower 7 is formed as follows:

In order to determine the correct number of degrees for the angles A and B, it is necessary to know the bore and the stroke of the cylinder of the engine, and the proper valve size for the intake valve leading into the firing chamber formed by the reciprocation of the piston within said cylinder. The proper valve size is determined empirically by the use of a formula as follows:

Cylinder bore divided by 2 minus 1/8" equals the proper valve size.

From experiments conducted in carrying out my invention, I have determined that the stroke of the piston is a required factor in determining the required degree of angle on the cam-follower 7. I have found that in determining this angle, the following empirical formulas may be employed.

If the stroke of the piston is under and not more than 4 1/2", the formula used is 4 degrees to the inch of stroke. For example, a piston having a 4 inch stroke, multiplied by 4 degrees, will give 16 degrees as the proper angle for the cam-follower 7, this being angle A.

If the stroke of the piston is more than 4 1/2", and not more than 6", the empirical formula is 2 degrees to an inch of stroke. Thus a piston having a 5 1/2" stroke would require an 11 degree angle at A.

If the particular motor, or engine, does not have the proper size of intake valve, or valves, as determined by the empirical formula above set forth, this difference can be corrected by variation of the angle A, or by the degrees per inch of stroke used in determining the angle A. For example, if the valve 2 is 1 3/4" in size, then 3 7/8 degrees to the inch of stroke would be the correct empirical formula used for determining the angle A in a motor or engine in which the stroke of the piston was not more than 4 1/2 inches.

In order to maintain proper timing of the valve actions when varying their intervals of opening and closing in accordance with my invention, I have found that it is essential to re-time the motor to return the timing of the motor to its original timing prior to the introduction of the variation in valve action.

In order to correctly retime the motor in accordance with the variation placed in the valve action by the use of my invention, it is essential to know the number of teeth on the cam shaft gear. For example, the face A of the cam follower has a 12 degree angle, and a cam shaft gear 9 has 60 teeth. 360 degrees divided by 60 is 6 degrees per tooth. Thus the cam shaft 6 and cam shaft gear 9 should be advanced in the direction of travel 2 teeth, which is 12 degrees, and the engine be restored to its original timing.

I have found that the angle B, in order to maintain correct operation of the motor, should be one-half the number of degrees of the angle A plus 1 degree. This determination of the particular angle B is empirical, and has been determined by experimentation and is not exact but could be varied, plus or minus 1 degree or less without seriously affecting the action of the intake valves 2. To give a particular example of my invention as actually adapted in practice:

Considering a Waukesha motor having a bore of 4 1/2" and a stroke of 5 1/2". The valves 2 and 3 are 2 1/8" valves, and there is a 3/8" valve lift. The cam gear 9 has 66 teeth. 4 1/2", the bore, divided by 2, equals 2 1/4 minus 1/8 or 2 1/8", the correct valve size, so that the Waukesha motor, in accordance with my empirical formula, has valves the correct size.

The stroke 5 1/2" times 2 is 11 degrees for the angle A. 11 degrees divided by 2 plus 1 degree equals 6 1/2 degrees for the angle B which starts at a point 22 degrees from the axial line of the cam follower. The cam shaft gear having 66 teeth, it will be noted that each tooth is 5 15/33 degrees. 2 teeth equal 10 30/33 degrees, or practically 11 degrees, so that if the cam shaft be set ahead 2 teeth, the engine will be only 3/33, or 1/11 degrees from the original timing. The exact timing of the motor could be obtained by changing the number of teeth on the timing gear 9, or by the providing of a new set of timing gears with a different number of teeth.

In forming the cam-follower 8 for the exhaust valve 3, it is correct to open quickly, and close slowly, to maintain the exhaust valves wide open for a long period of time.

I form the face 14 of the exhaust valve to an angle substantially equal to the angle A, the exhaust valve being set with the angle in the position illustrated in Figure 2, so that the cam engages the face 14, tending to gradually increase the opening of the exhaust valve 3 to a maximum width, and then permitting the exhaust valve 3 to close slowly.

In forming the faces 11 and 12 of the cam-follower 7, the face 11 begins from the peak 15 of the cam-follower 7, and the peak 15 is determined as being twice the number of degrees of the angle A measured between the longitudinal axis of the cam-follower 7 and a line drawn from the axis of rotation of the cam 4 to the point of tangency of the peak 15 with the cam 4. The angle C is twice the angle A.

In order to obtain smooth-running, and prevent clattering of the follower 7 on the cam 4, I have found that the peak line 16 of the cam-follower 7 should be curved from the center of the cam-follower to form at the center of the valve structure a peak from which the cam surface 11 diverges, so that as the cam travels over the surface 11, it will rotate the follower 7 to cause the follower 7 to pass off from the peak of the cam each time at the peak of the cam-follower, maintaining a uniform action.

Having fully described my invention, it is to be understood that I do not wish to be limited to the details herein set forth, but my invention is of the full scope of the appended claims.

I claim:

1. A valve push rod for an internal combustion engine including a cam follower having angular cam faces of such angle that said valve is actuated to maintain a uniform flow of fuel into the combustion chamber of said internal combustion engine.

2. A valve push rod for an internal combustion engine including a cam follower having two angular cam faces of different predetermined angles whereby said push rod is operated to open the inlet valve of said engine to maintain a uniform proportion or relation between the suction or vacuum created by the piston during its intake stroke and said valve opening whereby a maximum quantity of fuel will be drawn into the firing chamber of said engine.

3. A valve push rod for an internal combustion engine including a cam follower having two angular cam faces of predetermined angles for actuating the intake valve of said engine to give a variable opening of said valve in timed relation with relation to the reciprocation of the piston of said engine in order to maintain a uniform proportion between the inlet valve opening and the suction created by the piston traveling at a variable speed.

4. A valve push rod for an internal combustion engine including a cam follower having an angular cam face of predetermined angle for actuating the exhaust valve of said engine to control the speed of opening and closing of said exhaust valve whereby the exhaust valve is opened more rapidly and maintained wide open for a longer period of time and closed at a lower rate of speed.

5. A cam follower for actuating the inlet valve of an internal combustion engine comprising a cam contacting head having a long engaging surface at a predetermined acute angle to the axis of said head, and having a short disengaging surface at a predetermined acute angle to the axis of said head.

6. A cam follower for actuating the inlet valve of an internal combustion engine comprising a cam contacting head having a long engaging surface at a predetermined acute angle to the axis of said head, and having an adjacent short disengaging surface at a predetermined acute angle to the axis of said head.

7. A cam follower for actuating the inlet valve of an internal combustion engine comprising a cam contacting head having a long engaging surface at a predetermined acute angle to the axis of said head, and having an adjacent short disengaging surface at a predetermined acute angle to the axis of said head, and having the peak formed by the intersection of said engaging and disengaging surfaces spaced a predetermined distance from the normal axis of said head.

8. A cam follower for actuating the exhaust valve of an internal combustion engine comprising a cam contacting head having an engaging surface at a predetermined acute angle to the normal axis of said head.

Signed at Los Angeles, Calif., this 15th day of August, 1928.

ALFRED B. TUCKER.